United States Patent [19]

Banno

[11] 4,196,805
[45] Apr. 8, 1980

[54] ANTI-ELECTROSTATIC CHARGING CONVEYOR ROLLER MADE OF A SYNTHETIC RESIN

[76] Inventor: Hirokazu Banno, 8, Katasaka, Arao-cho, Toukai-shi, Aichi-ken, Japan

[21] Appl. No.: 885,254

[22] Filed: Mar. 10, 1978

[30] Foreign Application Priority Data

Dec. 1, 1977 [JP] Japan .......................... 52/161592[U]

[51] Int. Cl.² ........................................... B65G 15/08
[52] U.S. Cl. ................................... 198/827; 29/116 R
[58] Field of Search ..................... 29/116 R, 110, 129, 29/129.5, 130; 198/827, 830, 824, 825; 193/37; 308/20

[56] References Cited

U.S. PATENT DOCUMENTS

| | | | |
|---|---|---|---|
| 2,393,191 | 1/1946 | Robertson | 29/116 R X |
| 3,075,632 | 1/1963 | Watt | 29/116 R X |
| 3,219,175 | 11/1965 | Watt | 198/827 |
| 3,688,370 | 9/1972 | Cahill et al. | 29/116 R |

*Primary Examiner*—Louis Rimrodt
*Attorney, Agent, or Firm*—Browdy and Neimark

[57] ABSTRACT

A roller made of a synthetic resin, used for supporting a conveyor belt, possesses an anti-electrostatic-charge capability. Utilizing insert-forming injection molding, a conveyor carrier roller body is integrally formed concentrically about a thin walled metallic housing containing a rotary bearing assembly therein at the innermost position for concentrically forming a conveyor carrier roller body integrally with the metallic housing. The inner race of the bearing is force-fitted onto the roller shaft and the outer race of the bearing is force-fitted inside the metallic housing. A roller of such a construction will readily discharge the static electricity charged on the surface of the roller by conducting it to ground through a snap ring (fitted in a circular groove formed inside of the boss portion of the roller), the housing, the bearing, and the shaft. The snap ring positioned adjacent the electricity charging place functions like a lightening conductor through the point-discharging.

3 Claims, 6 Drawing Figures

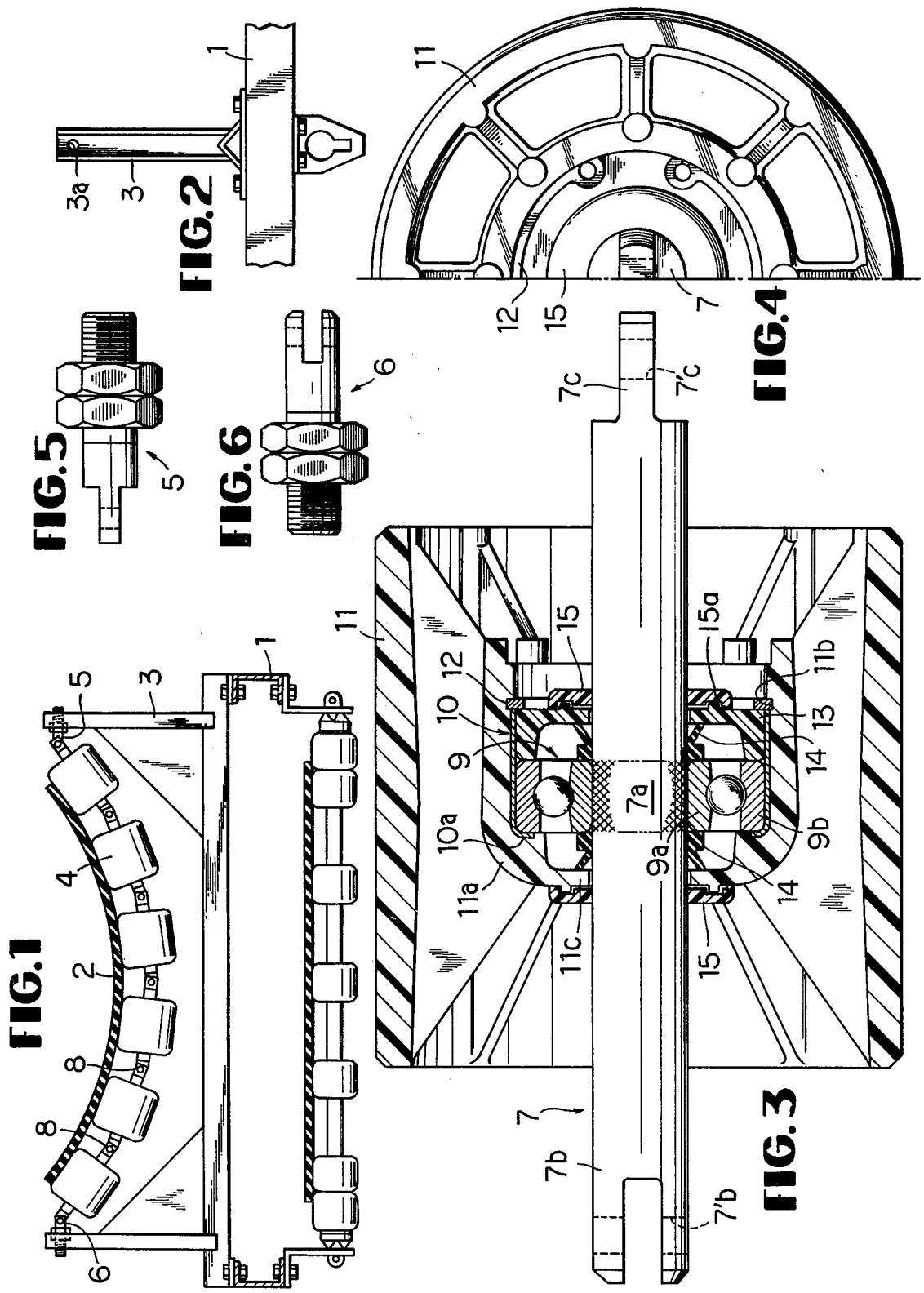

ANTI-ELECTROSTATIC CHARGING CONVEYOR ROLLER MADE OF A SYNTHETIC RESIN

BACKGROUND OF THE INVENTION

This invention relates to a carrier roller made of synthetic resin and used for supporting a conveyor belt, which roller has a function of discharging static electricity.

Rollers for a belt-conveyor have conventionally been made of metals, rubbers, or plastics; rollers used in the construction work or civil engineering field are mostly made of a metal because of its large strength, less wearing, or long durability. Further reason for that is that there is little likelihood of electrostatic charging and where is good conduction of generated electricity. Metallic rollers are, however, troubled by some unavoidable defects, such as, operation noise and relatively large rotation resistance due to their heavy weight. It consequently causes a large power consumption and increasing cost in equipment manufacture as well as in operation.

For the purpose of eliminating the abovementioned disadvantages, synthetic resin- or rubber-made rollers have been widely employed. These materials provided again a new problem of electrostatic charging on the surface of the rollers, because they are very high in the insulation resistance of electricity. Friction between the rubber belt and the rollers of synthetic resin or rubber is liable to generate static electricity, which often causes a spark by any chance. Unexpected sparking often gives rise to a fire which may develop into a great damage.

Static electricity charging has loomed large in the art, which should be solved by all means. A few anti-charging attempts have been made. Painting of an anti-charging paint was tried in vain, because of its short life, having no stable and durable effect. Using a filler of conductor materials, such as a mixture of carbon black pigment and plastic pellets, for the roller was also proposed, but did not become popular because of its high wearing rate. No decisive anti-charging roller has been introduced so far.

SUMMARY OF THE INVENTION

It is therefore a primary object of this invention to provide a synthetic resin-made roller, which has a perfectly practicable anti-charging feature.

It is another object of this invention to provide a synthetic resin-made roller, which is secured to a metallic housing such as by means of insert molding, speedily grounding the electricity by utilizing the principle of point discharge, through the intermediary of a metallic snap-ring.

It is a further object of this invention to provide a synthetic resin-made roller, having a good discharging feature, of simple structure, of low operation noise, of light weight, and suitable for cheap mass production.

BRIEF DESCRIPTION OF THE DRAWINGS

FIG. 1 is a vertical cross section of a belt-conveyor incorporating rollers of this invention;

FIG. 2 is a side view of an essential part of the belt-conveyor in FIG. 1;

FIG. 3 is an axial cross section of a roller in accordance with this invention;

FIG. 4 is a front elevational view of a roller of this invention by half;

FIG. 5 is a side view of a male shape fastening means; and

FIG. 6 is a side view of a female shape fastening means.

DETAILED DESCRIPTION OF A PREFERRED EMBODIMENT

Referring to FIG. 1, on a belt-conveyor frame 1 a pair of stands 3, standing in confrontation, carry an endless belt 2 which passes therebetween, the belt 2 being supported by a plurality of rollers 4 flexibly jointed with each other. Such stands 3 are disposed in the longitudinal direction normal to the drawing paper, with a certain predetermined distance between each other, for sustaining a plurality of rollers connected in a rosary-like chain or series. Near the top of these stands 3 is drilled a bore 3a for attaching a fastening means, which serves to sustain a series of carrier rollers (hereinafter an individual carrier roller will be called simply a roller). The fastening means is on one stand 3 of male shape as in FIG. 5, and on the other stand 3 of female shape as in FIG. 6, either of the fastening means being provided with a threaded portion and double nuts for rendering the fastening and unfastening of the series of rollers to and from the stand 3 easy and secure.

Each roller 4 has a relatively short shaft 7 along the axial line, and on the peripheral surface of the shaft 7, axially in the middle portion thereof, a jagged or rough portion is formed by knurling for being force-fitted with a ball (or roller) bearing assembly (hereinafter called a rotary bearing for short) thereon. The shaft 7 is formed on one end thereof into a groove 7b of female shape and on the other end into a protrusion 7c of male shape; these male and female portions 7b, 7c, i.e., coupling portions, are for providing an engaging surface to be connected in mortise joint with a spring pin 8 passing through a pin hole 7′b, 7′c which is drilled in each of coupling portions 7b, 7c perpendicularly thereto. These mortise joints are, just like the joint at the top of the stand 3 with the fastening means, pivotally rotatable in one plane parallel to the joint portions, or normal to the conveyor belt, but resistive to bending in the direction perpendicular thereto. In other words, all of these joints are pivotal and rotatable in only one plane, not allowing to be bent perpendicularly to the series of shafts.

A housing 10, which is placed in advance in the central part of a die when the roller body of synthetic resin is molded, is a thin walled cylindrical body made of a steel plate (SS 41P by JIS) by means of pressing, one end thereof being inwardly bent to form a flange portion 10a. It may be made from a cup-like body pressed from a flat plate, thereafter a hole, smaller in diameter than that of the bottom portion, being formed by punching at the bottom portion. A roller body 11 of nylon is made, by the "insert-molding" type injection molding, upon placing the housing 10 in advance in the die, integrally therewith, such that the housing is positioned concentrically with and embraced by the boss portion 11a of the roller body 11. On the inner surface of the boss portion 11a is, adjacent to the open end (not flanged) portion of the housing 10, formed a circular groove 11b for being fitted by a snap ring 12 so as to be electrically conductive with the housing 10 through direct abutting or metallic connection. A gap or space between the snap ring 12 and the outer race 9b of the bearing 9 is occupied by a nylon made bush 13 having enough width to span there. The outer race 9b of the bearing 9 cannot be shifted axially to either side, because it is restricted on one side by the flange 10a of the housing 10 and on the other side by the snap ring 12, via the bush 13. On either side of the inner race 9a of the bearing 9 a V-shape rubber ring 14 is fitted onto the shaft 7 for sealing oil-tightly on one side between the flange 11c of the boss portion 11 and the shaft 7, and on the other side between the bush 13 and the shaft 7. A pair of labyrinth collars 15, 15 protect the boss portion 11 from the ingress of dust in the atmosphere. Both are provided with a circular groove 15a inside thereof, concentrically with the shaft 7, for being loosely fitted into with a narrow gap by a circular rib formed respectively on the outer surface of the snap ring 12 and the flange 11c of the boss portion 11.

A plurality of rollers of such construction are flexibly connected into a series, with each end portion of the shaft 7 having a male and female coupling means 7b, 7c to be spanned between a pair of confronted stands 3, being attached or anchored thereto with the fastening means 5, 6 (male and female). When the series is operated as a carrier for the belt 2, an individual roller 4 is hung in suspension due to the load and the empty weight thereof, and forms as an entire series a concavely curved line, more exactly being a broken line described by the consecutively connected shafts 7 between the pair of stands 3. This series is flexible in the plane parallel to the coupling portions, i.e., engaging surface of the mortise joint or in a vertical plane, but strongly resistive to bending in the perpendicular direction to the above-mentioned plane, which ensures a stable and steady suspension posture of the series of rollers during the conveyer operation. The grease sealed in the bearing 9 is protected from flowing out by the pair of V-shaped rubber rings 14 and the ingress of dust into the bearing 9 is, as stated earlier, prevented by the pair of labyrinth collars 15.

Now the function of anti-charging of static electricity, an essential factor or purpose of this invention will be described hereunder.

The anti-charging device of this invention is based on a technical concept of giving a good conduction to the static electricity, which may be accumulated on the surface of the roller of synthetic resin due to the friction with the belt of rubber, particularly by leading it to the ground to be discharged or neutralized. By means of grounding the static electricity in accordance with this invention, both sparking during the conveyor operation and resultant fire can be avoided.

The metallic matter which is located nearest the surface of the roller, the place of concentrated electrical charging, in this embodiment, is the snap ring 12 fitted into the boss portion 11a of the roller 11; and this snap ring 12 is electrically connected to the metallic housing 10, and consequently to the ground through the bearing 9, shaft 7, stands 3, and the frame 1. So the snap ring 12 functions just like a lightening conductor of a building for doing point-discharging. Static electricity charged on the surface of the roller 11 may thus be neutralized by the electricity of the earth through the discharging at the pointed ends of the snap ring 12. When the amount of charge is large enough, on the charging surface, to cause a discharge across the gap therebetween, it may occur to spark at a time to be neutralized; so long as the conduction to ground is perfect, the electricity can be smoothly grounded without causing any damage to other parts. This embodiment is well devised to conduct the electricity (static electricity) charged on the roller, without giving any trouble to other parts, to the ground.

This invention is not limited to the way shown in the preferred embodiment, but may be varied or modified in many ways without departing from the scope or the spirit of this invention.

The mortise joint, flexible in a plane, employed in this embodiment, in a similar way to that shown in FIG. 5 and FIG. 6 using male and female motise joint fastening means, may be substituted by other flexible-in-one-plane joints, such as a chain joint.

Knurling working given to the central part of the shaft 7 for securely fitting the inner race 9a of the bearing 9 thereon may be, for example, replaced by using a stepped shaft with a fastener.

Insert-molding of a metallic housing in a molded roller body may be accomplished, not being limited to injection molding, even by compression molding, and the metallic housing can be, more generally, either physically or chemically secured to a molded roller of rubber or synthetic resin.

The nylon bush 13 may be omitted on condition that the snap ring 12 is capable of securing the outer race 9b of the bearing 9.

The nylon roller body 11 may be replaced by other suitable synthetic resins, and the housing 10 made of steel plate (SS 41P) may also be substituted by other metallic materials.

This invention is characterized, in its principle, that while maintaining the advantages of being light in weight, low in operation noise, low in operation resistance, and consequently capable of power saving and decreasing of component parts due to its manufacturing of rubber or synthetic resin, it possesses an excellent discharging feature by grounding the static electricity which may be charged on the surface of the roller, by point-discharging at the snap ring fitted in the boss of the roller, via the metallic housing, the bearing, and the shaft. In this way a roller perfectly capable of preventing static electricity charging can be obtained, while maintaining the feature of simple construction and low manufacturing cost.

What is claimed is:

1. A roller for use in supporting the conveyor belt in a belt-conveyor apparatus and being free of electrostatic charge build-up when in use, comprising:
    a short shaft having on each end portion thereof a pivotable coupling means for connecting with the coupling means of the shaft of an adjacent roller when in use in such a manner as to allow relative rotation between rollers in one plane only;
    a rotary bearing assembly, the inner race thereof being fitted onto the axially middle portion of said shaft;
    a metallic housing of thin-walled cylindrical shape having an inwardly turned flange portion on one end thereof, the outer race of said bearing assembly being force-fitted inside said housing;
    a roller body, made of rubber or synthetic resin, having a central boss portion with a circular groove therein, said housing being securely held inside said boss portion;
    a metallic snap ring fitted into the circular groove of the central boss of said roller body, said snap ring being in contact, capable of conducting electricity therethrough, with said housing and securing the position of said bearing assembly in cooperation with the flange portion of said housing, whereby said snap ring is electrically grounded by way of said housing, said bearing assembly and said shaft when the roller is in use.

2. A roller claimed in claim 1, wherein said roller body is made of thermoplastic synthetic resin and wherein said metallic housing is injection-molded, in an insert-molding style, concentrically with and inside said roller body.

3. An anti-electrostatic charge conveyor belt support assembly using rollers in accordance with claim 1, comprising:
 a pair of electrically grounded stationary stands; and
 a plurality of said rollers connected in a chain, each end of said chain being connected to one of said stationary stands in a manner such as to allow relative rotation between the rollers and said stand in one plane only, said chain spanning said stands in suspension, forming a concavedly curved line.

* * * * *